(12) United States Patent
Hirata

(10) Patent No.: US 9,465,443 B2
(45) Date of Patent: Oct. 11, 2016

(54) GESTURE OPERATION INPUT PROCESSING APPARATUS AND GESTURE OPERATION INPUT PROCESSING METHOD

(71) Applicant: Sony Computer Entertainment Inc., Tokyo (JP)

(72) Inventor: Shinichi Hirata, Kanagawa (JP)

(73) Assignees: Sony Corporation, Tokyo (JP); Sony Interactive Entertainment In., Tokyo (JP)

( * ) Notice: Subject to any disclaimer, the term of this patent is extended or adjusted under 35 U.S.C. 154(b) by 226 days.

(21) Appl. No.: 13/921,558

(22) Filed: Jun. 19, 2013

(65) Prior Publication Data
US 2013/0278503 A1   Oct. 24, 2013

Related U.S. Application Data

(63) Continuation of application No. PCT/JP2011/007089, filed on Dec. 19, 2011.

(30) Foreign Application Priority Data

Dec. 27, 2010   (JP) ................................ 2010-290717

(51) Int. Cl.
| | | |
|---|---|---|
| G06F 3/033 | (2013.01) | |
| G09G 5/08 | (2006.01) | |
| G06F 3/01 | (2006.01) | |
| G06F 3/03 | (2006.01) | |

(52) U.S. Cl.
CPC ............ G06F 3/017 (2013.01); G06F 3/0304 (2013.01)

(58) Field of Classification Search
None
See application file for complete search history.

(56) References Cited

U.S. PATENT DOCUMENTS

| | | |
|---|---|---|
| 6,064,354 A | 5/2000 | DeLuca |
| 8,175,374 B2 | 5/2012 | Pinault |
| 8,456,416 B2 | 6/2013 | Izumi |
| 2006/0012675 A1 | 1/2006 | Alpaslan |

(Continued)

FOREIGN PATENT DOCUMENTS

| | | |
|---|---|---|
| CN | 101866214 A | 10/2010 |
| JP | 2004265222 A | 9/2004 |

(Continued)

OTHER PUBLICATIONS

Office Action for corresponding JP Application No. 2010290717, dated Jul. 15, 2014.

(Continued)

*Primary Examiner* — Nicholas Lee
(74) *Attorney, Agent, or Firm* — Matthew B. Dernier, Esq.

(57) ABSTRACT

An instruction point extraction unit extracts an instruction point of a user from an image in which a gesture of the user made while the user is looking at a display is captured. A distance calculation unit obtains a distance to the instruction point in the depth direction. A gesture recognition parameter adjustment unit adjusts a parameter related to detection sensitivity in the depth direction when operation input by the gesture of the user is recognized, based on at least one of resolution of distance measurement in the depth direction and three-dimensional display performance of a display. A gesture recognition processing unit recognizes the operation input by the gesture of the user based on the adjusted parameter in reference to the distance to the instruction point in the depth direction calculated by the distance calculation unit.

7 Claims, 8 Drawing Sheets

(56) References Cited

U.S. PATENT DOCUMENTS

| | | | |
|---|---|---|---|
| 2007/0132721 A1 | 6/2007 | Glomski | |
| 2008/0122798 A1* | 5/2008 | Koshiyama | G06F 3/0412 345/173 |
| 2009/0296991 A1* | 12/2009 | Anzola | 382/107 |
| 2009/0315740 A1* | 12/2009 | Hildreth et al. | 341/20 |
| 2010/0100853 A1* | 4/2010 | Ciudad et al. | 715/856 |
| 2010/0208035 A1 | 8/2010 | Pinault | |
| 2010/0283730 A1* | 11/2010 | Miyazaki | 345/158 |
| 2011/0141009 A1 | 6/2011 | Izumi | |
| 2011/0210947 A1 | 9/2011 | Kawaguchi | |

FOREIGN PATENT DOCUMENTS

| | | |
|---|---|---|
| JP | 2008117371 A | 5/2008 |
| JP | 2008176438 A | 7/2008 |
| JP | 4318056 B | 8/2009 |
| JP | 2010009558 A | 1/2010 |
| JP | 2010015553 A | 1/2010 |
| JP | 2010522380 A | 7/2010 |
| JP | 2010525432 A | 7/2010 |
| WO | 2008115997 A2 | 9/2008 |
| WO | 2010038822 A1 | 4/2010 |

OTHER PUBLICATIONS

International Search Report for the corresponding PCT Application No. PCT/JP2011/007089, dated Mar. 19, 2012.

International Preliminary Examination Report on Patentability with Written Opinion for the corresponding PCT Application No. PCT/JP2011/007089, dated Jul. 2, 2013.

Office Action for corresponding CN Application No. 2011800623628, dated Jun. 3, 2015.

Office Action for corresponding JP Application No. 2015045530, 4 pages, dated Jan. 5, 2016.

\* cited by examiner

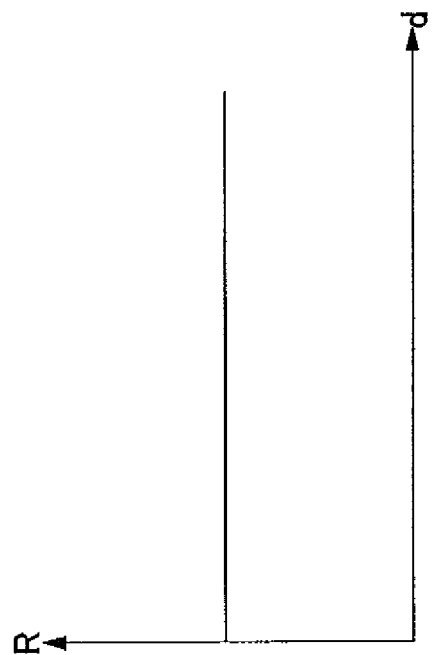
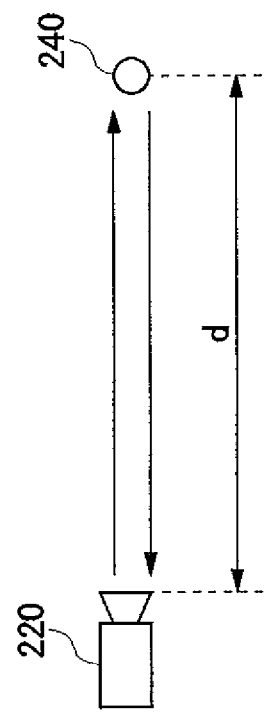

GESTURE OPERATION INPUT PROCESSING APPARATUS AND GESTURE OPERATION INPUT PROCESSING METHOD

BACKGROUND OF THE INVENTION

1. Field of the Invention

The present invention relates to an apparatus and a method for processing operation input entered by a gesture.

2. Description of the Related Art

Three-dimensional television sets that allow for the viewing of stereoscopic images have become available in standard households. It has also become possible to play a Blu-ray disk in which three-dimensional images are recorded and view high-quality three-dimensional images displayed on a three-dimensional display. In a game device, a game application that uses three-dimensional images can be played by connecting the game device to a three-dimensional display. Furthermore, a three-dimensional image of a user is sometimes captured using a camera provided with a distance sensor and brought into a game application.

There are growing number of game applications that allow a user to enter an operation or participate in a game. Further use of input operations entered by gestures is expected if game applications become three dimensional in future.

Patent document No. 1 discloses a portable game device provided with an interface that allows a user to provide an instruction from a position away from a screen.

[Patent document No. 1] WO 10/038822 pamphlet

There is a need for a technology of a gesture interface for supporting operation input entered by a gesture of a user. Regarding a system, it is necessary to control detection sensitivity at the time of the recognition of a gesture at an adequate level in accordance with the performance of the system so that a user can enter an operation through a gesture without feeling stressed in front of a display.

SUMMARY OF THE INVENTION

In this background, a purpose of the present invention is to provide a technology for facilitating operation input entered by a gesture.

A gesture operation input processing apparatus according to one embodiment of the present invention includes: an instruction point extraction unit configured to extract an instruction point of a user from an image in which a gesture of the user made while the user is looking at a display is captured; a distance calculation unit configured to obtain a distance to the instruction point in the depth direction; a parameter adjustment unit configured to adjust a parameter related to detection sensitivity in the depth direction when operation input by the gesture of the user is recognized, based on at least one of resolution of distance measurement in the depth direction and three-dimensional display performance of a display; and a gesture recognition processing unit configured to recognize the operation input by the gesture of the user based on the adjusted parameter in reference to the distance to the instruction point in the depth direction calculated by the distance calculation unit.

Another embodiment of the present invention relates to a gesture operation input processing method. The method is a gesture operation input processing method in a three-dimensional gesture input system provided with an interface for supporting operation input entered by a gesture of a user and includes: extracting an instruction point of a user from an image in which a gesture of the user made while the user is looking at a display is captured; obtaining a distance to the instruction point in the depth direction; adjusting a parameter related to detection sensitivity in the depth direction when operation input by the gesture of the user is recognized, based on at least one of resolution of distance measurement in the depth direction and three-dimensional display performance of a display; and recognizing the operation input by the gesture of the user based on the adjusted parameter in reference to the distance to the instruction point in the depth direction.

Optional combinations of the aforementioned constituting elements, and implementations of the invention in the form of methods, apparatuses, systems, computer programs, data structures, and recording media may also be practiced as additional modes of the present invention.

BRIEF DESCRIPTION OF THE DRAWINGS

FIGS. 4A and 4B are diagrams explaining a distance measurement principle and distance resolution of a TOF camera;

DETAILED DESCRIPTION OF THE INVENTION

The invention will now be described by reference to the preferred embodiments. This does not intend to limit the scope of the present invention, but to exemplify the invention.

Figure 1:
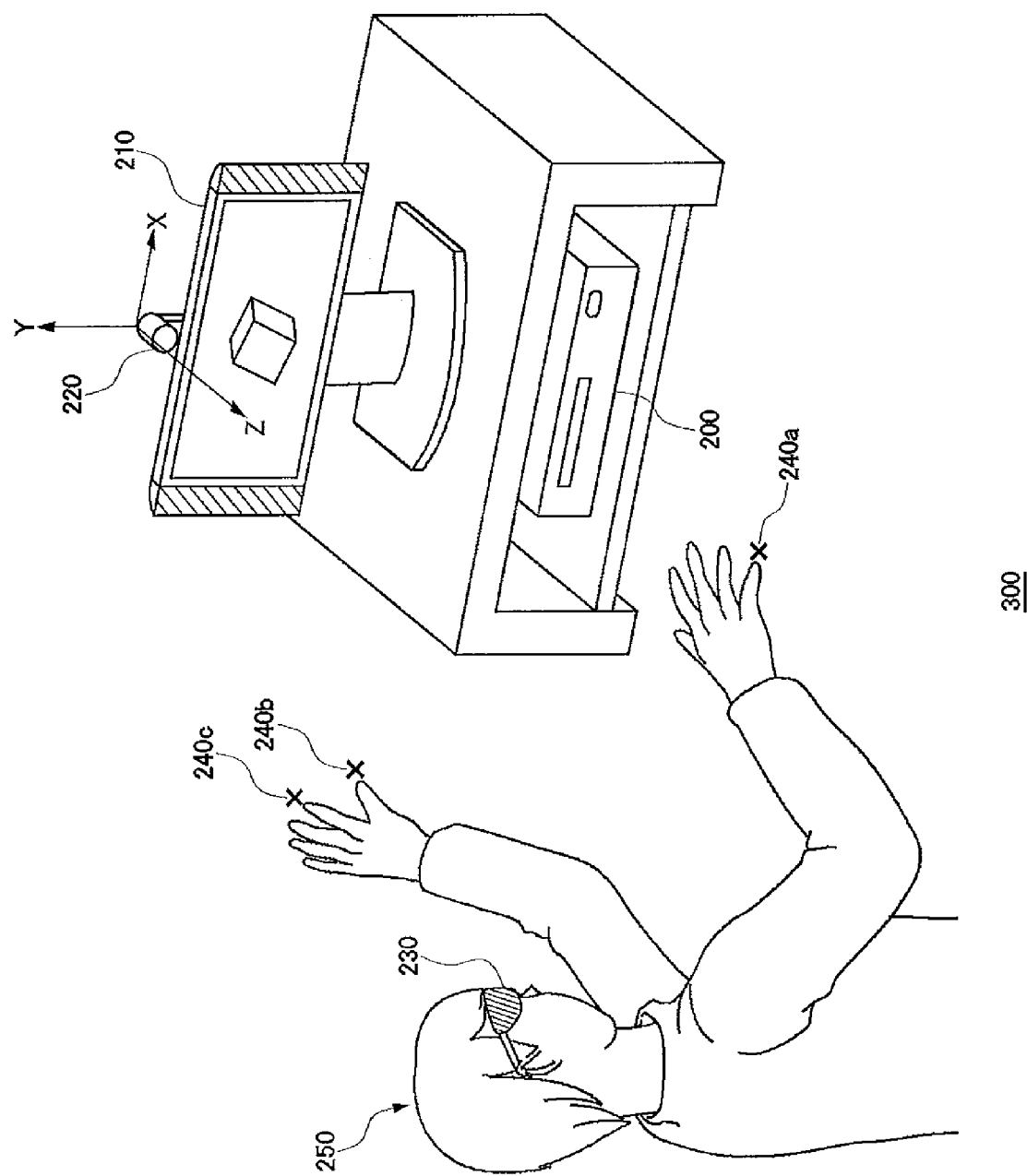
FIG. 1 is a diagram illustrating the configuration of a three-dimensional gesture input system.

FIG. 1 is a diagram illustrating the configuration of a three-dimensional gesture input system 300. The three-dimensional gesture input system 300 includes a game device 200, a display apparatus 210, and a camera 220.

The game device 200 executes content of a game application or the like and displays a video image, an operation menu, and the like on the display apparatus 210. Instead of the game device 200, a player may be used that reproduces content stored in a recording medium.

The display apparatus 210 is a display that allows for two-dimensional display and/or three-dimensional display. If the display apparatus 210 allows for only two-dimensional display, content is displayed as a two-dimensional image. If the display apparatus 210 also allows for three-dimensional display, content is displayed as a two-dimensional image or a three-dimensional image in accordance with an instruction from a user or an instruction from an application.

The camera 220 captures an image of a gesture of a user 250. The camera 220 is provided, for example, above the display apparatus 210. A coordinate system is now considered where an installation position of the camera 220, the display surface, and a direction perpendicular to the display surface are set to be a point of origin, an X-Y plane, and a Z axis, respectively. The camera 220 has a ranging function of measuring a distance to an object in the Z-direction. For example, the camera 220 may have a distance sensor for measuring a distance to an object by projecting a sound wave or light on the object and then measuring time required until the sound wave or light returns back after reflection. Alternatively, the camera 220 may have an image processing unit for calculating a depth value based on parallax images captured from two different viewpoints.

The user 250 enters an operation command for the game device 200 by a gesture while watching an image displayed on the display apparatus 210. When the display apparatus 210 is provided with dedicated glasses 230 for stereoscopic viewing just like a stereoscopic display, the user 250 wears the dedicated glasses 230 so as to watch a screen of the display apparatus 210.

The user 250 gives an operation command to the game device 200 by moving, e.g., fingers of his/her hand in a three-dimensional space as instruction points 240a through 240c. On the screen of the display apparatus 210, respective movement trajectories of the instruction points 240a through 240c that have been detected by the game device 200 are displayed to support gesture input of the user.

The game device 200 detects, in a gesture image of the user 250 captured by the camera 220, the instruction points 240a through 240c by, e.g., fingers of the user 250 and obtains respective distances to the instruction points 240a through 240c from the camera 220.

In order to facilitate the detection of the instruction points 240a through 240c by the game device 200, the user may stretch out only an index finger. Alternatively, in order to facilitate the image recognition of an instruction point 240, the user 250 may make a gesture while wearing a finger cap with a marker on his/her finger or using a pointer with a marker. Alternatively, the user 250 may make a gesture while having a controller in his/her hand that is equipped with a position sensor capable of detecting a three-dimensional coordinate and transmit the three-dimensional coordinate detected by the position sensor to the game device 200 from the controller by wireless communication or the like.

In accordance with the movement of an instruction point 240 by the user 250 in the three-dimensional space, the game device 200 recognizes an operation command intended by the user and executes the operation command. In particular, by detecting the movement of a gesture of the user 250 in the depth direction, the game device 200 gives a degree of freedom to a gesture of the user 250, allowing a gesture input interface to have flexibility.

Figure 2:
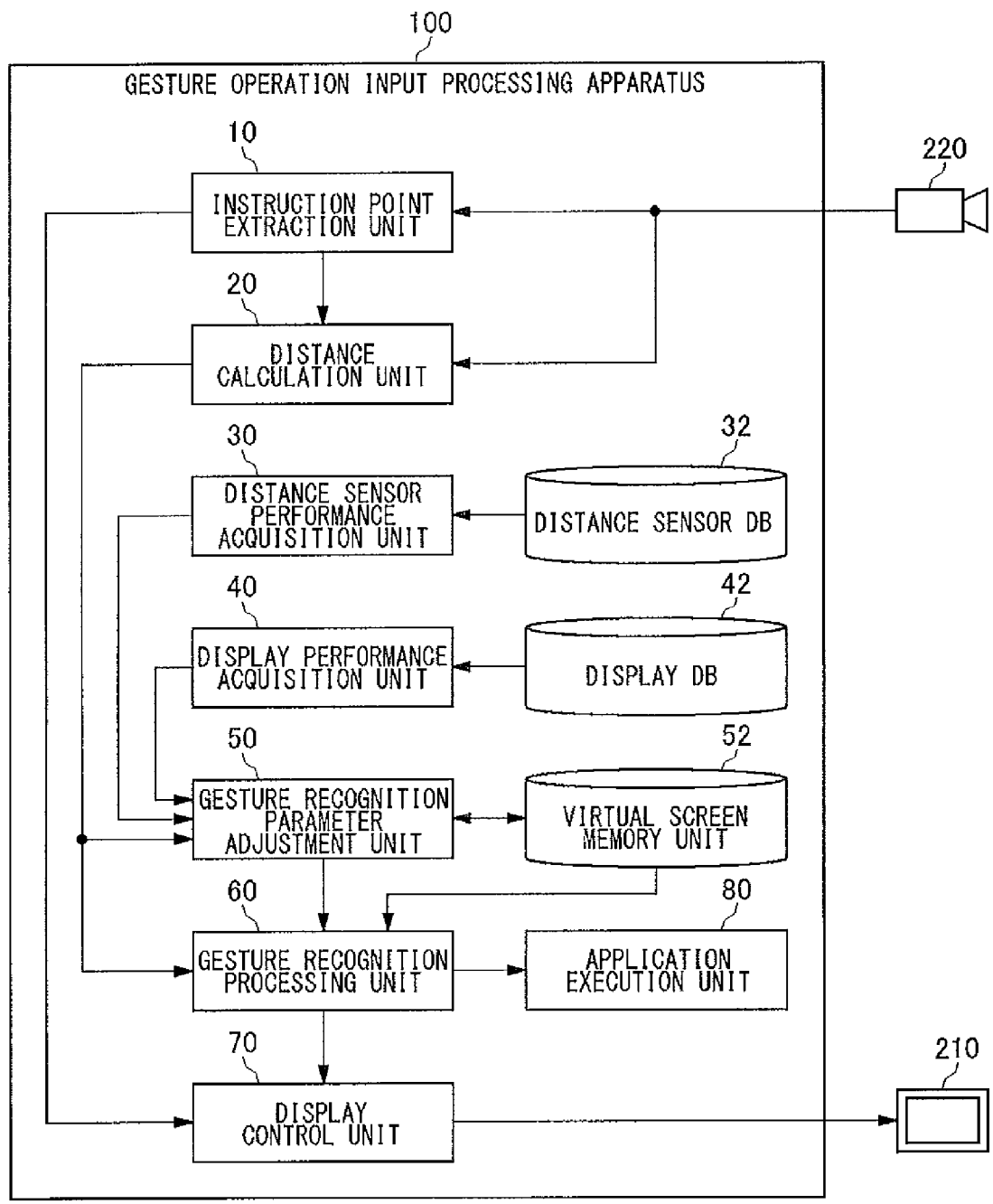
FIG. 2 is a diagram illustrating the configuration of a gesture operation input processing apparatus.

FIG. 2 is a diagram illustrating the configuration of a gesture operation input processing apparatus 100. A part of or the entire functional configuration of the gesture operation input processing apparatus 100 shown in FIG. 2 can be implemented in a game device 200 by hardware, software, or a combination of both. Alternatively, a part of or the entire functional configuration of the gesture operation input processing apparatus 100 may be implemented in a personal computer, a portable device, a portable terminal, or the like.

The gesture operation input processing apparatus 100 has an instruction point extraction unit 10, a distance calculation unit 20, a distance sensor performance acquisition unit 30, a distance sensor database 32, a display performance acquisition unit 40, a display database 42, a gesture recognition parameter adjustment unit 50, a virtual screen memory unit 52, a gesture recognition processing unit 60, a display control unit 70, and an application execution unit 80.

The instruction point extraction unit 10 acquires a gesture image of the user 250 captured by the camera 220 and extracts an instruction point 240 of the user from the gesture image. Since the instruction point 240 is a part to which a marker is added such as the tip of a finger of the user, the instruction point 240 can be extracted from the image using a commonly-used image processing function such as edge extraction, image analysis, or the like.

A distance calculation unit 20 obtains a distance to the instruction point 240 in the depth direction. If the camera 220 has a ranging function of a triangulation type, the distance calculation unit 20 obtains a distance to the instruction point 240 in the depth direction from a parallax image captured from two different viewpoints. If the camera 220 has a distance sensor with TOF (time of flight) such as an active-type laser distance meter, a radar, or the like, the distance calculation unit 20 obtains a distance to the instruction point 240 by acquiring, from the camera 220, a round-trip time required after light is projected on the instruction point 240 until the light returns after reflection by the instruction point 240 and then by multiplying the round-trip time by the velocity of light.

In reference to the distance sensor database 32, the distance sensor performance acquisition unit 30 acquires information related to the resolution of the distance sensor of the camera 220 and provides the information to the gesture recognition parameter adjustment unit 50. The resolution information of the distance sensor includes identification information or the like that indicates a range of a measurable distance and indicates whether a ranging method of the distance sensor is a triangulation type or a TOF type.

In reference to the display database 42, the display performance acquisition unit 40 acquires information related to the display performance of the display apparatus 210 and provides the display performance information of the display apparatus 210 to the gesture recognition parameter adjustment unit 50. The display performance information includes information related to three-dimensional display performance. For example, the display performance information includes identification information indicating whether the display apparatus 210 is a 2D display that does not have display capability in the Z-direction just like a normal liquid crystal television, a stereoscopic display that allows for stereovision (binocular stereovision), or a 3D display that is capable of displaying a three-dimensional space.

Based on the resolution of the distance sensor provided from the distance sensor performance acquisition unit 30, the three-dimensional display performance of the display provided from the display performance acquisition unit 40, and a measured distance to the instruction point 240 provided from the distance calculation unit 20, the gesture recognition parameter adjustment unit 50 adjusts a parameter used at the time of gesture recognition. The parameter used at the time of the gesture recognition is particularly used for the adjustment of sensitivity for detecting the movement of the instruction point 24 in the depth direction.

The gesture recognition parameter adjustment unit 50 increases the sensitivity by refining the granularity for detecting the movement of the instruction point 24 in the depth direction if the resolution of the distance measurement in the depth direction is high. On the contrary, the gesture recognition parameter adjustment unit 50 decreases the sensitivity by coarsening the granularity for detecting the movement of the instruction point 24 in the depth direction if the resolution of the distance measurement in the depth direction is low. Similarly, the gesture recognition parameter adjustment unit 50 increases the sensitivity by refining the granularity for detecting the movement of the instruction point 24 in the depth direction if the three-dimensional display performance of the display is high. On the contrary, the gesture recognition parameter adjustment unit 50 decreases the sensitivity by coarsening the granularity for detecting the movement of the instruction point 24 in the depth direction if the three-dimensional display performance of the display is low.

In the present embodiment, a virtual screen is set in front of the display apparatus 210, and the instruction point 240 is activated at an occasion when the instruction point 240 passes through the virtual screen. If the instruction point 240 is located before the virtual screen from the user's side, the instruction point 240 is deactivated so that a time when operation input is entered by a finger or the like by the user and a time when operation input is not entered by a finger or the like by the user can be easily distinguished. A plurality of virtual screens may be set before the display apparatus 210 so that the user can enter operation input in stages by sticking his/her finger into the screens in stages. The virtual screen memory unit 52 stores information regarding installation positions, installation intervals, and the like of such virtual screens.

The gesture recognition parameter adjustment unit 50 can adjust the sensitivity for detecting the movement of the instruction point 24 in the depth direction by adjusting a parameter for the installation positions, installation intervals, and the like of the virtual screens stored in the virtual screen memory unit 52.

In reference to a distance to the instruction point 240 in the depth direction calculated by the distance calculation unit 20 based on the adjusted parameter, the gesture recognition processing unit 60 recognizes a gesture of the user in the three-dimensional space and identifies an operation command. Based on the distance to the instruction point 240 in the depth direction, the gesture recognition processing unit 60 determines whether the instruction point 240 has passed through a virtual screen that is set in front of the display apparatus 210, activates the instruction point 240 if the instruction point 240 has passed through the virtual screen, and identifies operation input by the gesture of the user. The display control unit 70 displays a movement trajectory of the instruction point 240 on the display apparatus 210 in order to indicate what kind of user gesture the gesture recognition processing unit 60 recognizing.

The application execution unit 80 executes the operation command identified by the gesture recognition processing unit 60 and reflects the operation command in an application.

Figure 3B:
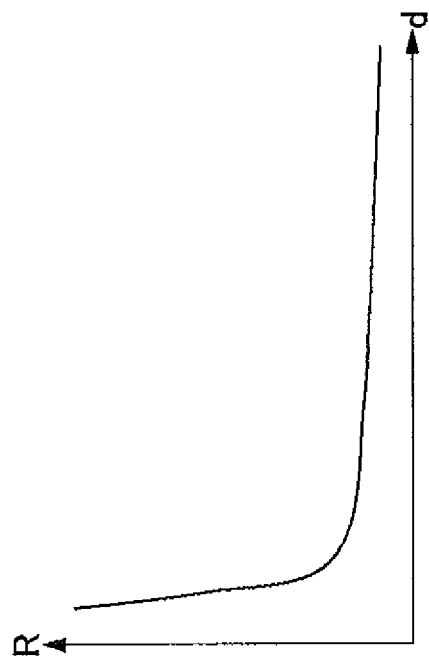
FIGS. 3A and 3B are diagrams explaining a distance measurement principle and distance resolution of a triangulation camera.
Figure 3A:
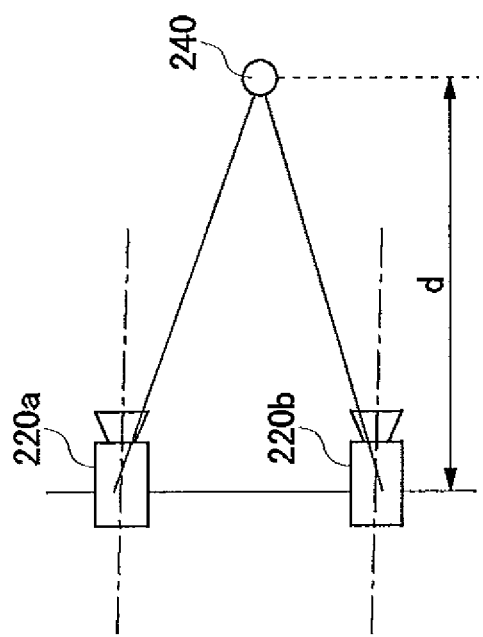

FIGS. 3A and 3B are diagrams explaining a distance measurement principle and distance resolution of a triangulation camera 220. As shown in FIG. 3A, in the case of triangulation, a distance d to the instruction point 240 is measured by capturing a parallax image from different viewpoints using two cameras 220a and 220b or by capturing a parallax image while changing a viewpoint by moving a single camera 220. An example of a range camera that uses a principle of triangulation is a stereo camera.

A graph shown in FIG. 3B indicates a distance resolution R for an absolute distance d in the triangulation camera 220. The horizontal axis of the graph represents the absolute distance d from a viewpoint to an object, and the vertical axis represents the distance resolution R by triangulation. As shown in FIG. 3B, in the case of triangulation, the distance resolution R decreases as a distance to the object becomes farther away, and the measurement accuracy thus drops. In contrast, as the distance to the object becomes closer, the distance resolution R becomes higher, and the measurement accuracy is thus improved.

FIGS. 4A and 4B are diagrams explaining a distance measurement principle and distance resolution of a TOF camera 220. In the case of the TOF camera 220, a distance to an object is measured by projecting infrared light or an ultrasonic sound wave on the object and then measuring a reflected wave thereof. As shown in FIG. 4A, in the TOF method, a round-trip time t required for light that is emitted from a sensor of the camera 220 to return to the sensor after hitting and getting reflected by the instruction point 240 is measured. The round-trip time t is then multiplied by the velocity of light c and divided by 2 so as to obtain the distance d, as shown in the following expression.

$$d=t*c/2$$

A graph shown in FIG. 4B indicates a distance resolution R for an absolute distance d in the TOF camera 220. As shown in FIG. 4B, in the case of the TOF method, the distance resolution R is constant regardless of a distance to the object, and the measurement accuracy does not drop even when the distance to the object becomes farther away.

Although the measurement accuracy of the triangulation camera 220 drops as the distance to the object becomes farther, the measurement accuracy can be improved by further increasing an interval between two viewpoints. In consideration of the installation of a camera 220 on a display apparatus 210 in a standard household, it is advantageous to use a TOF camera 220, whose measurement accuracy is constant regardless of an absolute distance, since there is a limit on increasing a viewpoint interval.

Regarding the display apparatus 210, there is also a difference in display capability that affects operation input entered by a gesture. A two-dimensional display, for example, a common liquid crystal television display does not have expression ability in a Z-direction. In the case of such a two-dimensional display, a circle with a variable distance in the depth direction is often obtained when the user makes a circle in the air while watching a movement trajectory of himself/herself or an instruction point 240 reflected in the display.

A stereoscopic display that allows for stereovision (binocular stereovision) has expression ability in the Z-direction and allows the user to have a stereoscopic view by viewing a pair of left and right images with a naked eye or polarizing glasses. For example, stereoscopic viewing is possible by a method where a left image and a right image are alternately entered for left and right eyes using liquid crystal shutter glasses by alternately displaying the left and right images in a time-multiplexed manner or a method where a left image and a right image can be viewed by a left eye and a right eye, respectively, with a naked eye using a parallax barrier or lenticular lens. In the case of such a stereoscopic display, a circle that is parallel to a display surface can be made when the user makes a circle in the air while watching the display. However, there are many stereoscopic displays for which a user's viewpoint position for stereoscopic viewing is fixed, allowing for stereoscopic viewing only in a single direction from a given viewpoint. The stereoscopic displays thus cannot follow a change in the user's viewpoint position.

A three-dimensional display with multiple viewpoints according to an integral imaging method, a holographic method, or the like allows for stereoscopic viewing from different viewpoint positions by displaying a plurality of different pairs of left and right images in accordance with a viewpoint. In the case of such a three-dimensional display, a user is able to have a stereoscopic view from any viewpoint position. Thus, it looks as if there exists a real object in a three-dimensional space, and an operation in the depth direction can be accurately entered while watching a stereoscopic image that is displayed. A three-dimensional display is capable of following a change in a user's viewpoint position, thus allowing for more natural stereoscopic viewing. Furthermore, by using a holographic method, substantially unlimited pairs of left and right images can be displayed, and almost complete stereoscopic viewing is thus possible.

As the display apparatus 210 is changed from a two-dimensional display to a stereoscopic display and further to a three-dimensional display, the operation accuracy in the Z-direction at the time of entering an operation by a gesture by a user increases, allowing operation input to be entered by making a gesture that is rich in the Z-direction.

In a three-dimensional gesture input system 300 according to the present embodiment, an operational feeling of a user is optimized by adjusting a parameter for gesture recognition in accordance with the distance measurement resolution of the camera 220 and the three-dimensional display performance of the display apparatus 210.

Figure 5:
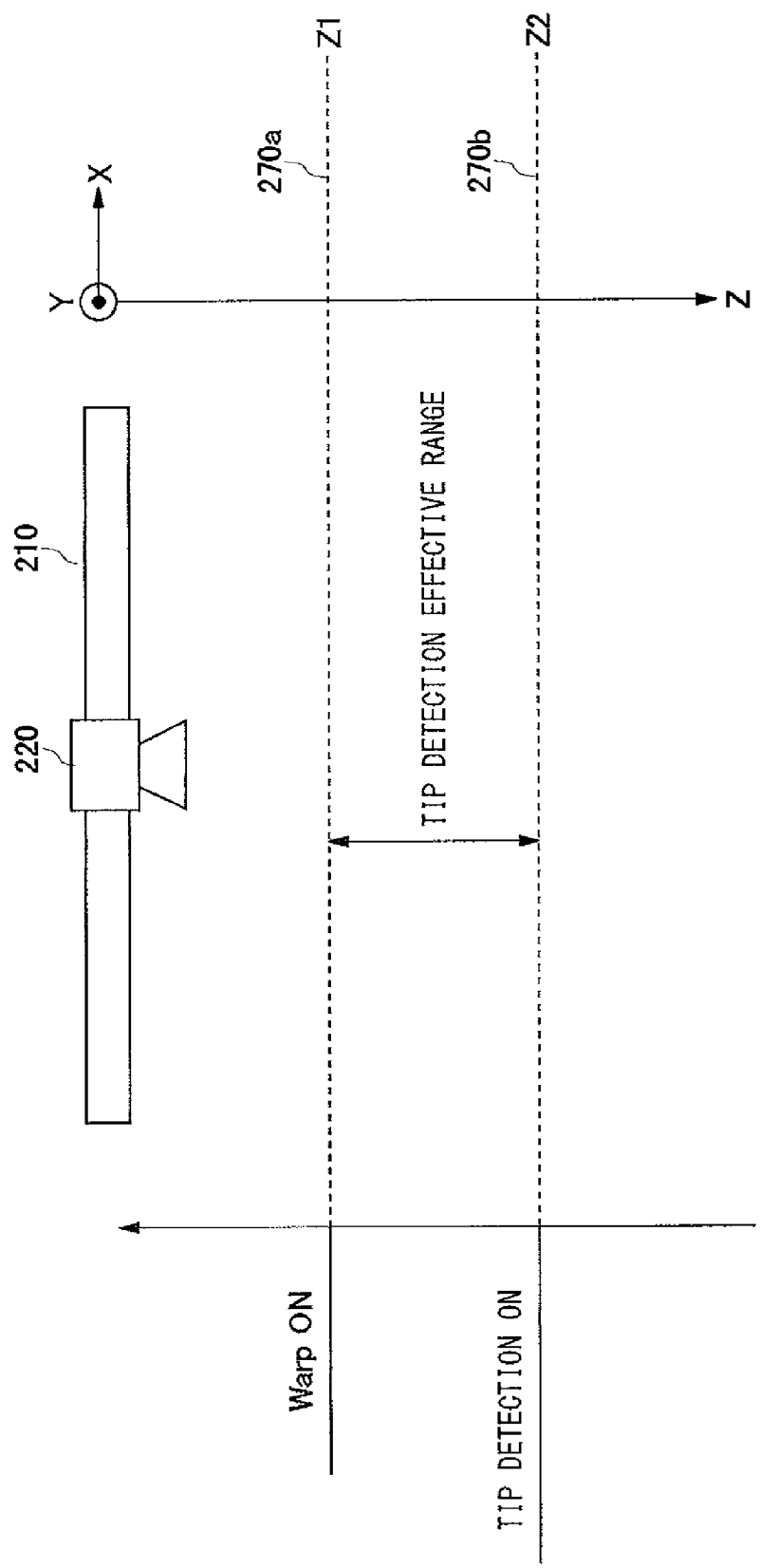
FIG. 5 is a diagram explaining a virtual screen that is set in front of a display apparatus.

FIG. 5 is a diagram explaining a virtual screen that is set in front of the display apparatus 210. A camera 220 installed on the display apparatus 210, the surface of the display apparatus 210, and a depth direction perpendicular to the surface of the display apparatus 210 are set to be a point of origin, an X-Y plane, and a Z axis, respectively, in a coordinate system. In the coordinate system, a first virtual screen 270a and a second virtual screen 270b, which are imaginary, are provided at positions where respective distances d from the camera 220 are Z1 and Z2 (Z1<Z2), respectively.

When the user stretches out a finger or the like toward the display apparatus 210 such that an instruction point 240 breaks through these virtual screens, the instruction point 240 is activated. The virtual screens each have a distance switch function for activating the instruction point 240 in accordance with a depth distance to the instruction point 240.

When the user stretches out a finger of his/her hand toward the display apparatus 210 such that the value of a Z coordinate at the position of the instruction point 240 becomes smaller than Z2, it is determined that the instruction point 240 has broken through the second virtual screen 270b. Furthermore, when the value of the Z coordinate at the position of the instruction point 240 becomes smaller than Z1, it is determined that the instruction point 240 has broken through the first virtual screen 270a.

For example, if the instruction point 240 breaks through the second virtual screen 270b at a position located at a distance Z2, the gesture recognition processing unit 60 may recognize the movement as an operation of selecting a button or the like on the display. If the instruction point 240 further breaks through the first virtual screen 270a at a position located at a distance Z1, the gesture recognition processing unit 60 may recognize the movement as a warp operation.

By providing two-staged virtual screens according to a distance in the depth direction as described above, the gesture recognition processing unit 60 can identify different operation commands based on a change in the depth direction of a gesture by the user. As the number of stages of virtual screens is increased, even more different operation commands can be identified based on the number of stages of virtual screen to be broken through. When the number of stages of virtual screens is increased, more variation can be created in operation commands by detecting a change in acceleration of movement in the depth direction.

Figure 6A:
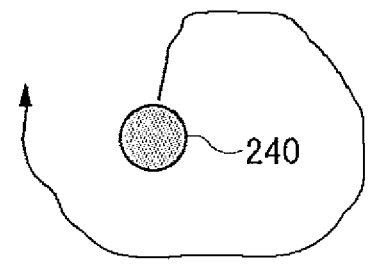
FIGS. 6A through 6E are diagrams explaining examples of operation input entered by a gesture.

FIGS. 6A through 6E are diagrams explaining examples of operation input entered by a gesture. FIG. 6A represents an example where a finger is stuck into a virtual screen so as to enter relative control by moving the finger from right to left or up and down or making a circle while using a position at which the finger is stuck into a virtual screen as the origin. For example, when the finger breaks through the virtual screen, the instruction point 240 becomes active, and an object or icon displayed in the display apparatus 210 is selected. By moving the instruction point 240 from right to left or up and down, the object or icon displayed on the screen can be moved from right to left or up and down. If an image or document is displayed on the screen of the display apparatus 210, scrolling from right to left or up and down may be achieved by moving the finger from right to left or up and down, respectively, and enlarged or reduced display may be achieved by making a circle clockwise or counter-clockwise, respectively.

Figure 6B:
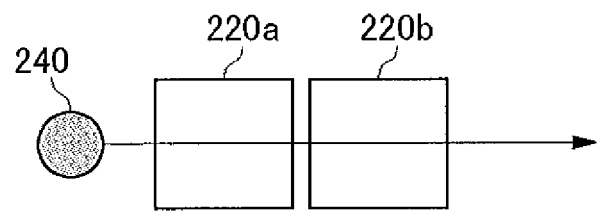

In FIG. 6B, when a finger is stuck into a virtual screen and moved widely from side to side such that the finger passes across the respective fields of view of the cameras 220a and 220b, the gesture recognition processing unit 60 determines that the user gesture is directed to flick input, and the application execution unit 80, for example, moves to the next screen or performs continuous scrolling in accordance with operation input that has been determined.

Figure 6C:
Figure 6D:

FIGS. 6C and 6D each illustrate a state where the user enters a pinch operation a gesture. Pinching is a pinching movement with two fingers to increase (pinch out) or decrease (pinch in) a space between the fingers.

In FIG. 6C, when two right and left fingers are stuck into a virtual screen so as to make a gesture of decreasing a space between the two fingers, the gesture recognition processing unit 60 determines that the gesture is a pinch-in operation, and the display control unit 70 performs a process of reducing a screen that is being displayed.

In FIG. 6D, when two right and left fingers are stuck into a virtual screen so as to make a gesture of increasing a space between the two fingers, the gesture recognition processing unit 60 determines that the gesture is a pinch-out operation, and the display control unit 70 performs a process of enlarging a screen that is being displayed.

Figure 6E:
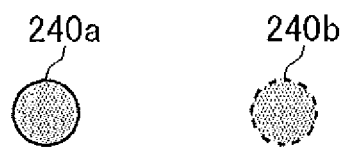

In FIG. 6E, when a finger is further stuck out while an instruction point 240 is active, the gesture recognition processing unit 60 determines that the gesture is directed to a warp operation. For example, the gesture recognition processing unit 60 may determine that sticking out only one finger is directed to pressing down a selection/execution button and that sticking out two fingers is directed to pressing down a cancel button.

Figure 7:
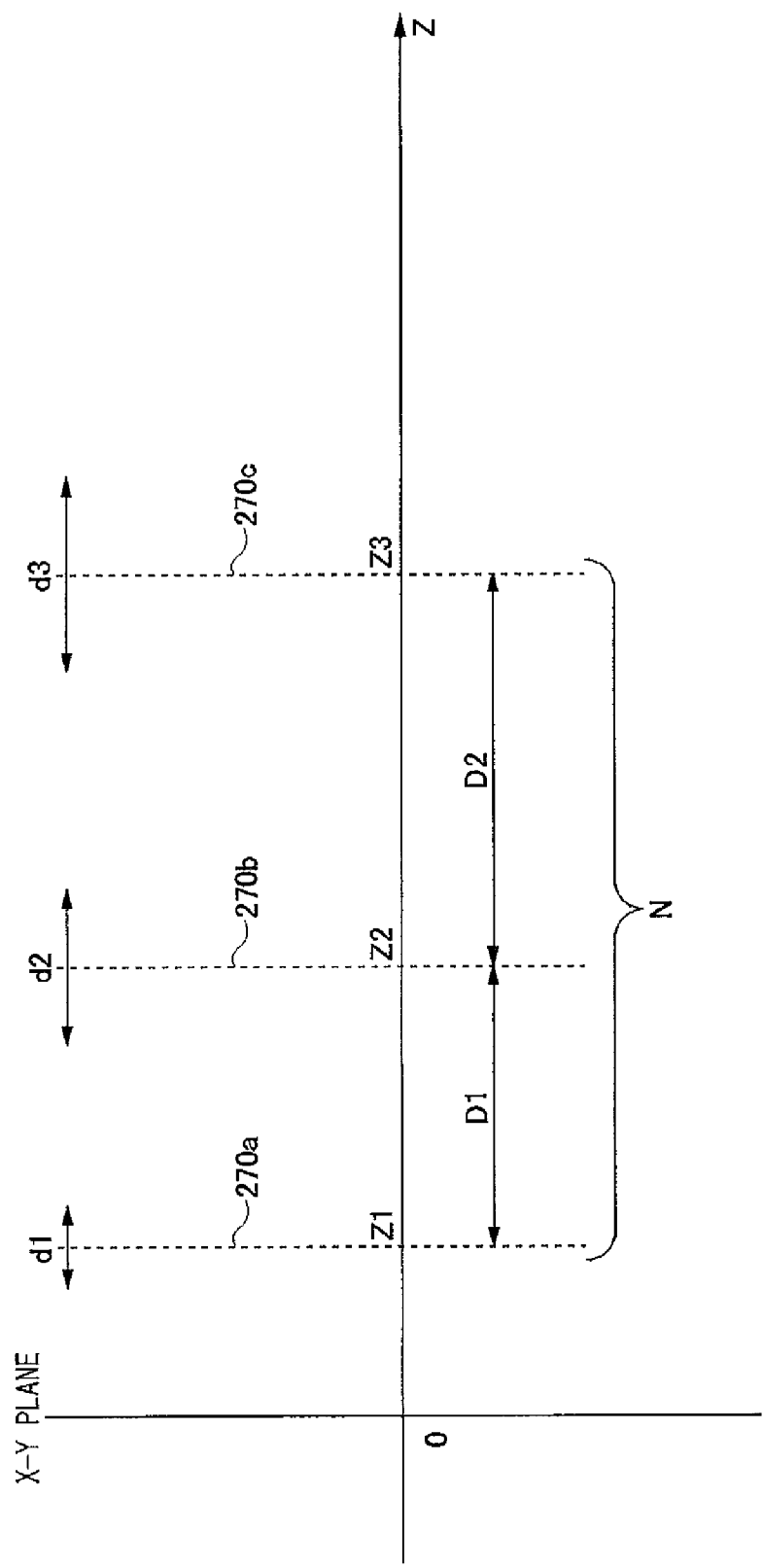
FIG. 7 is a diagram explaining parameters for adjusting the sensitivity of motion detection of a gesture in the depth direction.

FIG. 7 is a diagram explaining parameters for adjusting the sensitivity of motion detection of a gesture in the depth direction. It is assumed that a display surface and a direction perpendicular to the display surface are set to be an X-Y plane and a Z axis, respectively, and that virtual screens 270a, 270b, and 270c are provided at respective positions located at Z=Z1, Z=Z2, and Z=Z3 (Z1<Z2<Z3), respectively. It is assumed that the number of stages of virtual screen to be set, an interval between adjacent virtual screens, and the width of a dead band (dead zone) of each virtual screen are set to be N, D, and d, respectively.

The number N of the stages, the interval D, and the dead band width d are parameters related to the sensitivity of motion detection of a gesture in the depth direction. These parameters are adjusted based on distance measurement resolution and three-dimensional display performance. These adjustable parameters may be changed depending on a distance Z in the depth direction.

As the three-dimensional display performance of the display apparatus 210 increases while being changed from a two-dimensional display to a stereoscopic display and further to a three-dimensional display, the gesture recognition parameter adjustment unit 50 increases the number N of the stages and reduces both the interval D and the dead band width d. This is because there is no harm in increasing the detection sensitivity in the Z-direction since the user can make a motion that is rich in the Z-direction as the three-dimensional display performance increases.

If the camera 220 is a triangulation type, the number N of the stages, the interval D, and the dead band width d are changed according to a distance in the depth direction. In the case of a triangulation method, the measurement accuracy drops as an object becomes farther away from the camera 220. Thus, the detection sensitivity in the Z-direction is increased by increasing the number N of the stages while reducing the interval D and the dead band width d when a distance from the camera 220 is smaller than a predetermined threshold value. The detection sensitivity in the Z-direction is lowered by decreasing the number N of the stages while reducing the interval D and the dead band width d when the distance from the camera 220 is larger than the predetermined threshold value.

In the case where the camera 220 is a TOF type, since the measurement accuracy does not change even when the distance in the depth direction changes, the interval D and the dead band width d are set to be constant values. Since the measurement accuracy is high in a TOF type, the number N of the stages can be increased more compared to the case of a triangulation type.

Figure 8:
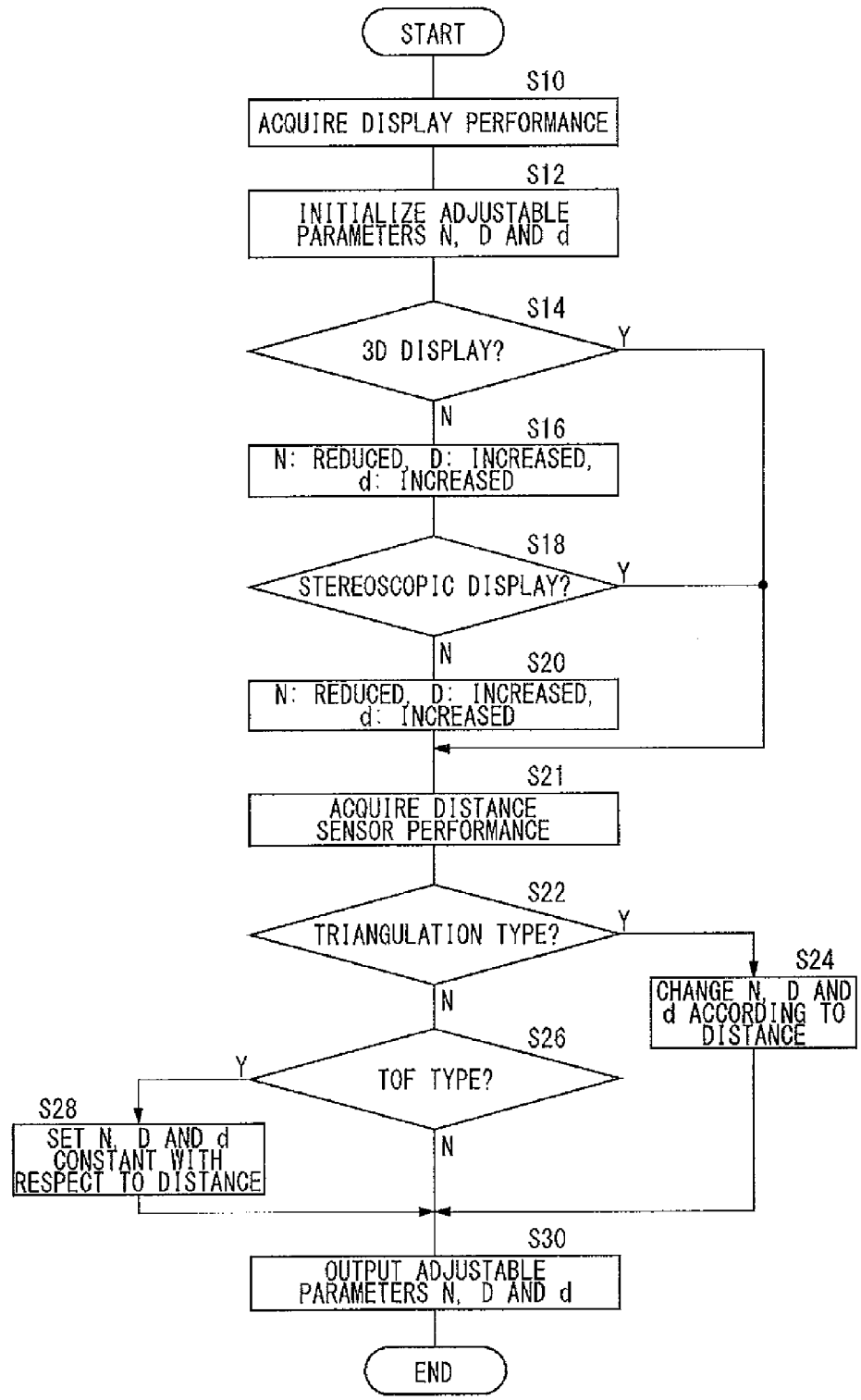
FIG. 8 is a flowchart explaining a method for adjusting parameters related to the sensitivity of motion detection in a Z-direction by the gesture operation input processing apparatus shown in FIG. 2.

FIG. 8 is a flowchart explaining a method for adjusting parameters related to the sensitivity of motion detection in a Z-direction by a gesture operation input processing apparatus 100. A flowchart shown in FIG. 8 displays a processing procedure performed by each component by a combination of "S" (initial letter of "Step"), which represents "step", and a number. In the case where some sort of a determination process is performed by a process displayed by a combination of a letter "S" and a number, the processing procedure is displayed while adding a letter "Y" (the initial of the word "Yes") when the determination result is positive (e.g., Y in S14) and is displayed while adding a letter "N" (the initial of the word "No") when the determination result is negative (e.g., N in S14).

The display performance acquisition unit 40 acquires data related to display performance and, particularly, to three-dimensional display performance from the display database 42 (S10). A driver of the display apparatus 210 is installed in the game device 200 at the time the display apparatus 210 is connected to the game device 200. The display performance acquisition unit 40 acquires the data related to the three-dimensional display performance by making an inquiry to the display database 42 based on driver information of the display apparatus 210. Alternatively, if the data related to the three-dimensional display performance is included in the driver of the display apparatus 210, the display performance acquisition unit 40 may retrieve the data related to the three-dimensional display performance from the driver.

The gesture recognition parameter adjustment unit 50 sets respective initial values of the number N of the stages, the interval D, and the dead band width d, which are adjustable parameters (S12). The initial values are default values based on the assumption that the display has advanced three-dimensional display performance.

Based on the data related to the three-dimensional display performance, the display performance acquisition unit 40 determines whether the display apparatus 210 is a three-dimensional display (S14). If the display apparatus 210 is a three-dimensional display (Y in S14), the step proceeds to Step S22 without changing the respective initial values of the number N of the stages, the interval D, and the dead band width d.

If the display apparatus 210 is not a three-dimensional display (N in S14), the gesture recognition parameter adjustment unit 50 reduces the number N of the stages and increases the interval D and the dead band width d (S16). The display performance acquisition unit 40 then determines whether the display apparatus 210 is a stereoscopic display (S18). If the display apparatus 210 is a stereoscopic display (Y in S18), the step proceeds to Step S22 without further changing the respective values of the number N of the stages, the interval D, and the dead band width d.

If the display apparatus 210 is not a stereoscopic display, that is, if the display apparatus 210 is a two-dimensional display (N in S18), the gesture recognition parameter adjustment unit 50 further reduces the number N of the stages and increases the interval D and the dead band width d (S20).

The distance sensor performance acquisition unit 30 then acquires data related to the distance resolution of the camera 220 from the distance sensor database 32 (S21). A driver of the camera 220 is installed in the game device 200 at the time the camera 220 is connected to the game device 200. The distance sensor performance acquisition unit 30 acquires the data related to the distance resolution by making an inquiry to the distance sensor database 32 based on driver information of the camera 220. Alternatively, if the data related to the distance resolution is included in the driver of the camera 220, the distance sensor performance acquisition unit 30 may retrieve the data related to the distance resolution from the driver.

Based on the data related to the distance resolution, the distance sensor performance acquisition unit 30 determines whether the camera 220 is of a triangulation type (S22). If the camera 220 is a triangulation type, the number N of the stages, the interval D, and the dead band width d are made different according to a distance in the depth direction (S24). More specifically, the number N of the stages of a virtual screen is increased as the position of the virtual screen becomes closer to the camera 220, and the number N of the stages of a virtual screen is reduced as the position of the virtual screen becomes farther away from the camera 220. Regarding a virtual screen at a position close to the camera 220, an interval D between adjacent screens and a dead band width d are reduced since the measurement accuracy is high. Regarding a virtual screen at a position far from the camera 220, an interval D between adjacent screens and a dead band width d are enlarged since the measurement accuracy is low.

If the camera 220 is not a triangulation type (N in S22), the distance sensor performance acquisition unit 30 determines whether the camera 220 is of a TOF type based on the data related to the distance resolution (S26). If the camera 220 is a TOF type (Y in S26), the number N of the stages, the interval D, and the dead band width d of the virtual screen are set to be constant regardless of a distance in the depth direction, and the total number N of the stages of the virtual screen is increased (S28). If the camera 220 is not a TOF type (N in S26), the step proceeds to Step S30 without further adjusting the number N of the stages, the interval D, and the dead band width d.

The gesture recognition parameter adjustment unit 50 provides the number N of the stages, the interval D, and the dead band width d, which have been adjusted, to the gesture recognition processing unit 60 (S30).

As described above, according to the three-dimensional gesture input system 300 of the present embodiment, input by a gesture can be entered according to the performance of the system, without the user feeling any stress, by appropriately adjusting the detection sensitivity of a gesture by the user particularly in the depth direction based on the measurement resolution of a distance sensor and the three-dimensional display performance of a display. Thus, even when a combination of a distance sensor and a display is changed, the detection sensitivity is automatically adjusted by a system, and a seamless and highly flexible gesture input interface can thus be provided.

Described above is an explanation of the present invention based on the embodiment. The embodiment is intended to be illustrative only, and it will be obvious to those skilled in the art that various modifications to constituting elements and processes could be developed and that such modifications are also within the scope of the present invention.

The invention claimed is:

1. A gesture operation input processing apparatus comprising:
   an instruction point extraction unit configured to extract an instruction point of a user from an image in which a gesture of the user made while the user is looking at a display is captured;
   a distance calculation unit configured to obtain a distance to the instruction point in the depth direction;
   a parameter adjustment unit configured to adjust a parameter related to detection sensitivity in the depth direction when operation input by the gesture of the user is recognized, based on at least one of resolution of distance measurement in the depth direction and three-dimensional display performance of a display; and
   a gesture recognition processing unit configured to recognize the operation input by the gesture of the user based on the adjusted parameter, and to detect whether the instruction point of the user passes through one or more of a plurality of virtual screens set in the depth direction, based on the distance to the instruction point in the depth direction calculated by the distance calculation unit,
   wherein the parameter adjustment unit adjusts, as the parameter related to the detection sensitivity in the depth direction, at least one of an installed number, an installation interval, and dead band of the plurality of virtual screens provided in the depth direction for allowing the instruction point to pass through.

2. The gesture operation input processing apparatus according to claim 1, wherein the gesture recognition processing unit activates the instruction point so as to recognize operation input entered by a gesture when the instruction point passes through one or more of the plurality of virtual screens.

3. The gesture operation input processing apparatus according to claim 1, wherein the parameter adjustment unit makes, when the display allows for three-dimensional display compared to when the display allows for two-dimensional display, at least one adjustment of: increasing the installed number; reducing the installation interval; and reducing the dead band of the virtual screens.

4. The gesture operation input processing apparatus according to claim 1, wherein the parameter adjustment unit sets, when the distance measurement in the depth direction is conducted by a measurement method of a TOF (time of flight) type, the installed number, the installation interval, and the dead band of the virtual screens to be constant with respect to the distance in the depth direction.

5. The gesture operation input processing apparatus according to claim 1, wherein, when the distance measurement in the depth direction is conducted by a measurement method of a triangulation type, the parameter adjustment unit sets the installed number, the installation interval, and the dead band of the virtual screens to be variable with respect to the distance in the depth direction.

6. A gesture operation input processing method in a three-dimensional gesture input system provided with an interface for supporting operation input entered by a gesture of a user, the method comprising:
   extracting an instruction point of a user from an image in which a gesture of the user made while the user is looking at a display is captured;
   obtaining a distance to the instruction point in the depth direction;
   adjusting a parameter related to detection sensitivity in the depth direction when operation input by the gesture of the user is recognized, based on at least one of resolution of distance measurement in the depth direction and three-dimensional display performance of a display; and
   recognizing the operation input by the gesture of the user based on the adjusted parameter, and to detect whether the instruction point of the user passes through one or more of a plurality of virtual screens set in the depth direction, based on the distance to the instruction point in the depth direction,
   wherein the adjusting step includes adjusting, as the parameter related to the detection sensitivity in the depth direction, at least one of an installed number, an installation interval, and dead band of the plurality of virtual screens provided in the depth direction for allowing the instruction point to pass through.

7. A non-transitory computer-readable recording medium storing a computer program, comprising:
   a module configured to extract an instruction point of a user from an image in which a gesture of the user made while the user is looking at a display is captured;
   a module configured to obtain a distance to the instruction point in the depth direction;
   a module configured to adjust a parameter related to detection sensitivity in the depth direction when operation input by the gesture of the user is recognized, based on at least one of resolution of distance measurement in the depth direction and three-dimensional display performance of a display; and
   a module configured to recognize the operation input by the gesture of the user based on the adjusted parameter, and to detect whether the instruction point of the user passes through one or more of a plurality of virtual screens set in the depth direction, based on the distance to the instruction point in the depth direction,
   wherein the module configured to adjust adjusts, as the parameter related to the detection sensitivity in the depth direction, at least one of an installed number, an installation interval, and dead band of the plurality of virtual screens provided in the depth direction for allowing the instruction point to pass through.

* * * * *